(12) United States Patent
Riedel

(10) Patent No.: US 12,384,022 B2
(45) Date of Patent: Aug. 12, 2025

(54) ROBOT ARM WITH AN ADDITIONAL OUTPUT LINK

(71) Applicant: KUKA Deutschland GmbH, Augsburg (DE)

(72) Inventor: Martin Riedel, Augsburg (DE)

(73) Assignee: KUKA Deutschland GmbH (DE)

( * ) Notice: Subject to any disclaimer, the term of this patent is extended or adjusted under 35 U.S.C. 154(b) by 0 days.

(21) Appl. No.: 18/710,401

(22) PCT Filed: Nov. 9, 2022

(86) PCT No.: PCT/EP2022/081300
§ 371 (c)(1),
(2) Date: May 15, 2024

(87) PCT Pub. No.: WO2023/094161
PCT Pub. Date: Jun. 1, 2023

(65) Prior Publication Data
US 2025/0010463 A1    Jan. 9, 2025

(30) Foreign Application Priority Data

Nov. 29, 2021  (DE) ...................... 10 2021 131 309.0

(51) Int. Cl.
*B25J 9/10* (2006.01)
(52) U.S. Cl.
CPC ..................... *B25J 9/106* (2013.01)
(58) Field of Classification Search
CPC ..... B25J 9/106; B25J 1/102; B25J 1/10; B25J 9/043
See application file for complete search history.

(56) References Cited

U.S. PATENT DOCUMENTS 10,828,769 B2* 11/2020 Meissner ............... B25J 9/1656
10,836,046 B2* 11/2020 Brudniok ............... B25J 15/103
(Continued)

FOREIGN PATENT DOCUMENTS

CN     114670241 A    6/2022
DE       3832114 A1   3/1990
(Continued)

OTHER PUBLICATIONS

German Patent Office; Search report in related German Patent Application No. 10 2021 131 309.0 dated Oct. 27, 2022; 6 pages.
(Continued)

*Primary Examiner* — Bobby Rushing, Jr.
(74) *Attorney, Agent, or Firm* — Dorton & Willis, LLP

(57) ABSTRACT

A robot arm includes multiple joints and multiple links which can be adjusted relative to one another by movements of the joints of the robot arm. Each driven joint is paired with a drive device, and each drive device is designed to adjust the robot arm joint paired therewith, namely by automatic actuation of a motor of the respective drive device. The robot arm has a distal end link designed in the form of a tool flange, a hand link arranged directly upstream of the distal end link in the kinematic chain of the joints and links and on which the distal end link is rotatably mounted about a flange rotational axis. An additional output link is rotatably mounted on the hand link about a rotational axis that is parallel to the flange rotational axis and which is arranged on the hand link so as to lie opposite the distal end link.

11 Claims, 7 Drawing Sheets

(56) References Cited

U.S. PATENT DOCUMENTS

| | | | |
|---|---|---|---|
| 10,843,344 B2 | 11/2020 | Haddadin | |
| 2009/0289591 A1* | 11/2009 | Kassow | B25J 18/00 |
| | | | 901/3 |
| 2020/0094280 A1* | 3/2020 | Holloway | B25J 5/00 |

FOREIGN PATENT DOCUMENTS

| | | |
|---|---|---|
| DE | 102005061193 A1 | 7/2007 |
| DE | 102011107332 A1 | 1/2013 |
| DE | 102016222675 A1 | 5/2018 |
| EP | 1671755 A1 | 6/2006 |
| WO | 2015078585 A2 | 6/2015 |
| WO | 2017221171 A1 | 12/2017 |

OTHER PUBLICATIONS

European Patent Office; Search Report in related International Patent Application No. PCT/EP2022/081300 dated Feb. 1, 2023; 20 pages.

\* cited by examiner

ROBOT ARM WITH AN ADDITIONAL OUTPUT LINK

CROSS-REFERENCE TO RELATED APPLICATIONS

This application is a national phase application under 35 U.S.C. § 371 of International Patent Application No. PCT/EP2022/081300, filed Nov. 9, 2022 (pending), which claims the benefit of priority to German Patent Application No. DE 10 2021 131 309.0, filed Nov. 29, 2021, the disclosures of which are incorporated by reference herein in their entirety.

TECHNICAL FIELD

The invention relates to a robot arm having multiple joints and multiple links which can be adjusted relative to one another by means of the movements of the joints of the robot arm, each driven joint being paired with a drive device, and each drive device being designed to adjust the robot arm joint paired therewith, namely by means of a respective automatic actuation of a motor of the respective drive device, the robot arm comprising a distal end link which is designed in the form of a tool flange, a hand link which is arranged directly upstream of the distal end link in the kinematic chain of the joints and links and on which the distal end link is rotatably mounted about a flange rotational axis.

BACKGROUND

WO 2015/078585 A2 describes a robot arm having at least two arm modules that can move relative to one another and at least one manually actuable input module for generating control signals for controlling the robot arm on the basis of a user input, in which both arm modules comprise a first interface on which the input module can be optionally mounted.

SUMMARY

The problem addressed by the invention is that of creating a robot arm comprising an extended scope of use.

The problem is solved by a robot arm having multiple joints and multiple links which can be adjusted relative to one another by means of the movements of the joints of the robot arm, each driven joint being paired with a drive device, and each drive device being designed to adjust the robot arm joint paired therewith, namely by means of a respective automatic actuation of a motor of the respective drive device, the robot arm comprising a distal end link which is designed in the form of a tool flange, a hand link which is arranged directly upstream of the distal end link in the kinematic chain of the joints and links and on which the distal end link is rotatably mounted about a flange rotational axis, and an additional output link which is rotatably mounted on the hand link about a rotational axis that is parallel to the flange rotational axis and which is arranged on the hand link so as to lie opposite the distal end link.

One or more of the joints, in particular all the joints, of the robot arm can be designed as swivel joints. Each link of the robot arm connects two neighboring joints of the robot arm in a fixed relative assignment of the positions and orientations of the neighboring joints to each other. Each link of the robot arm can be designed in one piece or in multiple parts.

The drive devices can be adjusted by a robot controller, in particular either automatically according to a robot program or manually actuated via an input device in a manual driving mode of the robot or alternatively also in a force-/torque-controlled mode of the robot arm by manually guiding the robot arm by gripping and moving at least one of its links. The respective drive device can be formed by an actuable motor. The respective drive device may in particular comprise an electric motor. In addition to the actual motor for generating torque, the drive device can additionally include a transmission and/or a drive control unit. The drive device can be designed for controlled operation of the motor. For this purpose, the drive device, in particular the drive control unit, may comprise a control device, in particular an electrical control device.

The tool flange forms a coupling means to which robot tools, which are held, moved, guided and possibly also actuated by the robot arm, can be attached to the robot arm. The robot tool can be a gripper, for example, which is designed to grip an object that is to be handled by moving the robot arm. Alternatively, the robot tool can also be a processing tool, such as a welding gun or other tool, in particular for mechanical processing or handling of a workpiece. In particular, the tool flange can be a flange having a flange pattern in accordance with ISO 9409-1:2004-03. The tool flange can also be referred to as a mechanical interface of the robot arm.

The distal end link is understood to be the link of the robot arm that is furthest away from its base, the main frame, in the kinematic chain of the multiple links and joints of the robot arm. In this respect, the base, i.e., the main frame of the robot arm, can also be referred to as the proximal end link. The kinematic chain of the multiple links and joints of the robot arm is usually lined up or counted starting from the base, i.e., starting from the main frame in the direction of the distal end link, i.e., the hand flange of the robot arm. In this respect, all links following the base or main frame are downstream of the base or main frame. In this respect, all the links of the robot arm other than the distal end link, i.e., the hand flange of the robot arm, are positioned upstream of the distal end link or the hand flange of the robot arm. The penultimate link of the robot arm in the kinematic chain is directly upstream of the distal end link or the hand flange of the robot arm and forms the hand link. In the case of an articulated robot having a kinematic chain of seven links and six joints, following one another alternately in series, the link immediately upstream of the distal end link (seventh link) or the hand flange of the robot arm is referred to as the sixth link. In this respect, the base or main frame of the robot arm forms the first link of the robot arm. In this case, the penultimate link of the robot arm in the kinematic chain is therefore adjusted directly by the fifth joint and forms the hand link. In the case of an articulated robot having a kinematic chain of eight links and seven joints, following one another alternately in series, the link immediately upstream of the distal end link (eighth link) or the hand flange of the robot arm is referred to as the seventh link. In this respect, the base or main frame of the robot arm forms the first link of the robot arm. In this case, the penultimate link of the robot arm in the kinematic chain is therefore adjusted directly by the sixth joint and forms the hand link.

The distal end link, which forms the tool flange, is mounted on the hand link so that it can rotate about its flange axis of rotation, by means of a swivel joint.

According to the invention, the hand link comprises an additional output link which is rotatably mounted about an axis of rotation parallel to the flange axis of rotation and which is arranged opposite the distal end link, on the hand link.

The additional output link is an output link different from the tool flange, which is rotatably mounted on the hand link, namely so as to be rotatable about an axis of rotation parallel to the flange axis of rotation, and is also actively adjustable, i.e., actively rotatable. Active rotation of the additional output link can be performed by a separate drive or motor specifically assigned to the additional output link, or by one of the drive devices of the joints of the robot arm, in particular by the drive device that drives the tool flange and/or directly drives the hand link.

The robot arm may comprise a mechanical configuration such that the flange axis of rotation of the tool flange always runs parallel to the axis of rotation of the additional output link and/or the hand guide means, in particular the flange axis of rotation of the tool flange and the axis of rotation of the additional output link and/or the hand guide means always lie on the same straight line, and in this case a pivot axis, about which the hand link is mounted rotatably on an arm link of the robot arm directly upstream of the hand link in the kinematic chain, is always arranged perpendicularly to the flange axis of rotation of the tool flange and to the axis of rotation of the additional output link or of the hand guide means.

A torque can be transmitted to a functional element coupled to the additional output element via the drivable additional output element. In addition, due to the coupling of the additional output element and the functional element, a torque can also be applied to the additional output element via the functional element.

In a first embodiment, the functional element can be a manual interface. The manual interface may comprise a hand guide means, in particular a hand rest and/or a handle. By means of the hand guide means, the hand rest and/or the handle, a user of the robot arm can grasp or grip the hand guide means, the hand rest and/or the handle and, for example, adjust the robot arm in a force-/torque-controlled operation of the robot arm by manually guiding the robot arm while grasping the hand rest and/or the handle and consequently by moving at least one of the links of the robot arm. Due to the drivability of the additional output link to which the functional element is coupled, the hand guide means, the hand rest or the handle can also be actively driven in order to provide tactile feedback to the user who grasps the hand guide means, the hand rest or the handle.

The hand guide means enables intuitive hand guidance of all degrees of freedom of the robot arm on a generously dimensioned hand support surface, which, however, unlike the prior art, neither reduces the payload due to a larger effective flange distance nor adversely affects the distal interfering contour. This operating interface enables both direct manual guidance of the robot arm (in a manual guidance mode) and (in another mode) the input of commands and settings on the robot or on the robot controller (input mode) as an input element.

In a second embodiment, the functional element can be a manual input means. The functional element may comprise one or more input means. Each input means can be designed as a single individual input element for controlling an individual function. Alternatively, the input means can be designed as a multi-input element for controlling multiple individual functions or comprise multiple individual input elements, it being possible for each of the multiple individual input elements to be designed to control an individual function.

The functional element can be a combination of a manual interface, or a hand guide means, a hand rest and/or a handle, and at least one manual input means. In this respect, the manual input means can also be actively driven due to the drivability of the additional output link to which the functional element is coupled, in order to provide the user, who is currently actuating the manual input means, with tactile feedback during manual input.

In a third embodiment, the functional element can be an additional tool. In this embodiment, the additional output link forms an additional coupling means to which additional robot tools, which can be held, moved, guided and, if necessary, also actuated by the robot arm, can be attached to the robot arm. The additional robot tool can be an additional gripper, for example, which is designed to grip an object that is to be handled by moving the robot arm. Alternatively, the robot tool can also be an additional processing tool, such as a welding gun or other tool, in particular for mechanical processing or handling of a workpiece. The additional output link may comprise an additional tool flange, which can in particular be an additional flange having a flange pattern in accordance with ISO 9409-1:2004-03. The additional tool flange can also be described as an additional mechanical interface of the robot arm.

The developments described below can optionally be used in the context of the first embodiment, the second embodiment and/or the third embodiment.

A transmission can be arranged within the hand link, which is designed to couple the additional output link to the distal end link, in order to convert a movement of the distal end link into a movement of the additional output link and/or to convert a movement of the additional output link into a movement of the distal end link.

The transmission can be a simple mechanical coupling that converts the movement of the distal end link directly into a uniform movement of the additional output link. The transmission can, for example, be a simple shaft into which a torque is introduced by the distal end link, transmitted through the shaft, and output to the additional output link.

The transmission may comprise a shaft that is designed to transmit a torque between the additional output link and the distal end link. In a simple embodiment, the shaft can be fixed to the distal end link at one shaft end and be fixed to the additional output link at its opposite other shaft end. In this way, a rotational movement of the distal end link can be converted directly into a uniform movement of the additional output link. In the same way, a rotational movement of the additional output link can then also be converted directly into a uniform movement of the distal end link if a manual interface, or a hand rest and/or a handle, is connected to the additional output link, which can be rotated manually by the hand of a user in order to adjust the distal end link manually as a result.

However, the transmission may also comprise at least one transmission stage by means of which a transmission ratio can be created in such a way that, despite mechanical coupling of the distal end link and additional output link, the additional output link has a different rotational speed during rotation compared with the respective rotational speed of the distal end link. The transmission ratio can be greater than 1. Alternatively, the transmission ratio can be less than 1.

The transmission may comprise a shiftable coupling, which is designed to transmit a torque between the additional output link and the distal end link in an engaged state, and to interrupt a transmission of a torque between the additional output link and the distal end link in a disengaged state.

The switchable coupling can be manually switchable. For this purpose, an actuating device can be arranged on the hand element, which can be actuated manually, for example by a user's hand, in order to engage the coupling. The actuating device can be designed to switch the coupling mechanically. Alternatively or additionally, the actuating device can be designed to switch the coupling in a manner driven by a drive device, and specifically controlled by the actuating device that is to be actuated manually.

Alternatively, the switchable coupling can be switched in a manner actuated automatically by a robot controller that actuates the robot arm.

The distal end link can be paired with a first drive device, which is designed to move the distal end link, and in this case the additional output link can be paired with a second drive device, which is different from the first drive device and is designed to move the additional output link.

In a first embodiment, the second drive device, which is paired with the additional output link, can be actuated independently of the first drive device, which is paired with the distal end link. Such actuation of the first drive device and the second drive device can take place using the robot controller.

In a second embodiment, the second drive device, which is paired with the additional output link, can be controlled in a manner dependent on the first drive device, which is paired with the distal end link. Such actuation of the first drive device and the second drive device can take place using the robot controller. In this respect, the robot controller can be designed and set up to actuate both the first drive device and the second drive device in such a way that the distal end link and the additional output link perform synchronous movements. In particular, the robot controller can be designed and set up to simulate a virtual transmission ratio by actuating the distal end element and/or additional output link, in which the additional output element has a different rotational speed from the respective rotational speed of the distal end link, during rotational movement. The virtual transmission ratio can be greater than 1. Alternatively, the virtual transmission ratio can be less than 1.

The first drive device may comprise a first motor and in this case the second drive device may here comprise a second motor, it being possible for the first motor and the second motor to be controlled in a manner dependent on one another by a control device, for example the robot controller of the robot arm.

At least one first position sensor can be paired with the distal end element, which sensor is designed to detect the rotational position of the distal end link, and at least one second position sensor can be paired with the additional output element, which sensor is designed to detect the rotational position of the additional output element.

The first position sensor and the second position sensor can be connected in terms of control technology to the control device or to the robot controller of the robot arm so that the robot controller can control the first drive device and/or the second drive device in accordance with the desired behavior of the distal end link and/or the additional output link, depending on the sensor values detected by the first position sensor and the second position sensor.

A hand guide means arranged on the hand link can be connected to the additional output link in such a way that the additional output link can be adjusted by manual actuation of the hand guide means and/or the hand guide means can be automatically adjusted by automatic driving of the additional output link.

In a first variant of the hand guide means, this may comprise a rotary actuator which is rotatably mounted on the hand link and comprises a ring having a circumferential ring surface and an end face delimited by the circumferential ring surface. The end face can be at least largely or completely flat. The end face of the rotary actuator can extend at least substantially and exactly parallel to the flange plane of the tool flange. In this case, the surface of the end face of the rotary actuator points in the opposite direction to the surface of the tool flange. The rotary actuator can be rotatably mounted on the hand link by the rotary actuator being rotatably mounted on a housing component of the hand link. Alternatively, a rotatable mounting of the rotary actuator on the hand link can be achieved by attaching the rotary actuator to the additional output link, the additional output link accordingly being rotatably mounted within the hand link. The rotary actuator can be coupled to the additional output element such that it can be manually detached and re-attached.

In a second variant of the hand guide means, the rotary actuator may comprise a detent device which specifies a detent position for equally spaced angular positions of the rotary actuator, which position can be left, during rotation of the rotary actuator, only when a predetermined minimum triggering force is overcome, in order to be able to skip an adjacent detent position.

The hand guide means is manually detachably fastened to the hand link or the additional output link and the additional output link comprises a tool coupling means to which an additional tool can be coupled, in an attached state of the hand guide means on the hand link or the additional output link, the tool coupling means being covered by the hand guide means, and in a removed state of the hand guide means from the hand link or the additional output link, the tool coupling means being accessible for coupling a tool.

Due to the tool coupling means, either a hand guide means or an additional tool can be coupled to the additional output link. If the additional tool is removed from the additional output link, the hand guide means attached to the additional output link can additionally form a securing means that prevents unwanted manual engagement in the additional output link, especially when the additional output link is in motion. In this respect, the hand guide means does not necessarily have to be coupled to the additional output link, but can rather be attached to a housing portion of the hand link. The hand guide means then also has the function of a cover cap.

The hand guide means may comprise a handle portion or a handle having at least one handle portion, which is designed for manual guiding of the robot arm by means of a user's hand. Accordingly, the hand guide means may comprise a protruding grip link which can be gripped by a user's hand in order to move the hand link of the robot arm by moving the grip link gripped by the hand and consequently to be able to change the joint angle positions of the robot arm.

However, the hand guide means may also comprise a grip portion that does not protrude, but rather is substantially formed on a surface of the hand guide means.

In a first variant of the grip portion, this can be formed by a textured surface of an annular surface of the hand guide means.

In a second variant of the grip portion, the structured surface can be formed by multiple discrete elevations on the annular surface of the hand guide means. The multiple discrete elevations can be evenly distributed around the circumference of the annular surface. The shape and size of the elevations can be adapted to the average shape and size of the fingers of a person's hand, taking ergonomic aspects into account. For example, the multiple discrete elevations can be designed in such a way that when the grip portion is gripped by a person's hand one elevation is inserted between two adjacent fingers of a hand.

In a third variant of the grip portion, the textured surface can be formed by multiple discrete indentations in the annular surface of the hand guide means. The multiple discrete indentations can be evenly distributed around the circumference of the annular surface. The shape and size of the indentations can be adapted to the average shape and size of the fingers of a person's hand, taking ergonomic aspects into account. For example, the multiple discrete indentations can be designed in such a way that when the grip portion is gripped by a person's hand, a fingertip of a finger of a person's hand engages in an indentation in each case.

As an alternative or in addition to a handle or grip portion, the hand guide means may comprise an input means which is designed for manually entering control commands into a control device which actuates the robot arm. In particular, the input means can be an electrical input means, for example an electrical switch or an electrical button that switches an electrical circuit that is connected to the robot controller. For example, an input signal can be transmitted to the robot controller by a person operating the robot arm, via the input means. The robot controller then executes a function assigned to the input means.

In a first variant of the input means, this may comprise at least one button or switch on an end face of the hand guide means.

In a second variant of the input means, this may comprise at least one, in particular multiple, buttons or switches on an annular surface of the hand guide means. In the case of multiple buttons or switches on the annular surface of the hand guide means, these can be arranged at equal distances from each other around the circumference on one surface of the annular surface of the hand guide means. The arrangement of the multiple buttons or switches on the annular surface can be matched to an arrangement of elevations and/or indentations as grip portions of the hand guide means; in particular, an individual button or switch can be paired with each elevation and/or indentation. Alternatively, a single button or switch can also be assigned to just each, for example, second elevation and/or indentation.

In a third variant of the input means, the hand guide means can be mounted so as to be adjustable in the axial direction relative to its axis of rotation, and the input means can be formed by pressing the complete hand guide means in the axial direction. A sensing function can be paired with this axial pressure, so that a signal is only generated for the duration of the pressure. Alternatively, a switching function can be paired with the axial pressing of the hand guide means, so that a switching state is activated by pressing the hand guide means once, in particular briefly axially, and the activated switching state is deactivated again when the hand guide means is pressed briefly axially again.

In a fourth variant of the input means, it can be assigned the function of an enabling button. The function in the form of an enabling button can be designed in the same way as an enabling button on a robot hand-held control unit, as described, for example, in EN ISO 10218-1:2011, in particular in Annex C.

In a fifth variant of the input means, it can be assigned the function of a selection key or input key (also: return key or enter key). In this function, the input means serves as a confirmation means to trigger a control function of the robot controller by a manual movement by a person's hand, or to make a certain selection from multiple possible states, i.e., to confirm the previously selected state. The selection of a specific state from multiple possible states can be made, for example, by one or two buttons or switches that are configured for scrolling in a menu of a user program that displays multiple states for selection.

In a sixth variant of the input means, the at least one button or switch can accordingly be an input means by which a scroll function can be executed so that a desired state can be selected, in a menu of a user program which displays multiple states for selection, by pressing the button or switch once or multiple times.

In a seventh variant of the input means, the input means can be formed by a rotary actuator which comprises a head that can be rotated about the axis of rotation and that can be actuated using the fingers of one hand. The rotary actuator can be switchable in multiple discrete mechanical stages in the manner of a rotary switch or be mechanically stepless in the manner of a potentiometer. A separate state can be paired with each discrete switching stage and/or certain angular positions of the rotary actuator. Such a rotary actuator can be used to create a scroll function so that a desired state can be selected in a menu of a user program that displays multiple states for selection, by turning the rotary actuator accordingly. In addition, a further switching function can be realized by pressing the rotary actuator, for example the function of a selection button or input button, as described in connection with the fifth variant of the input means. In this respect, the rotary actuator can form what is known as a "jog dial."

As an alternative or in addition to a grip portion and/or an input means, the hand guide means may comprise at least one display means which is designed to visually display states of the robot arm and/or the control device on the hand guide means.

In a first variant of the display means, an electronic display can be formed on the end face of the hand guide means. Values of predetermined state types can be shown on the display. The respective displayed state type can be selected manually from a set of multiple state types. The state type can also be selected manually by means of a hand guide means designed as a rotary actuator, the current value of which can then be shown on the display means.

In a second variant of the display means, an electronic touch display can be formed on the end face of the hand guide means, which in addition to the display function also has the option of manual button inputs. Using the touch display, manual entries can be made directly on the surface at the end face of the hand guide means.

Specific embodiments of the invention are explained in more detail in the following descriptions with reference to the accompanying drawings. Specific features of these embodiments, possibly considered individually or in further combinations, can represent general features of the invention, regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
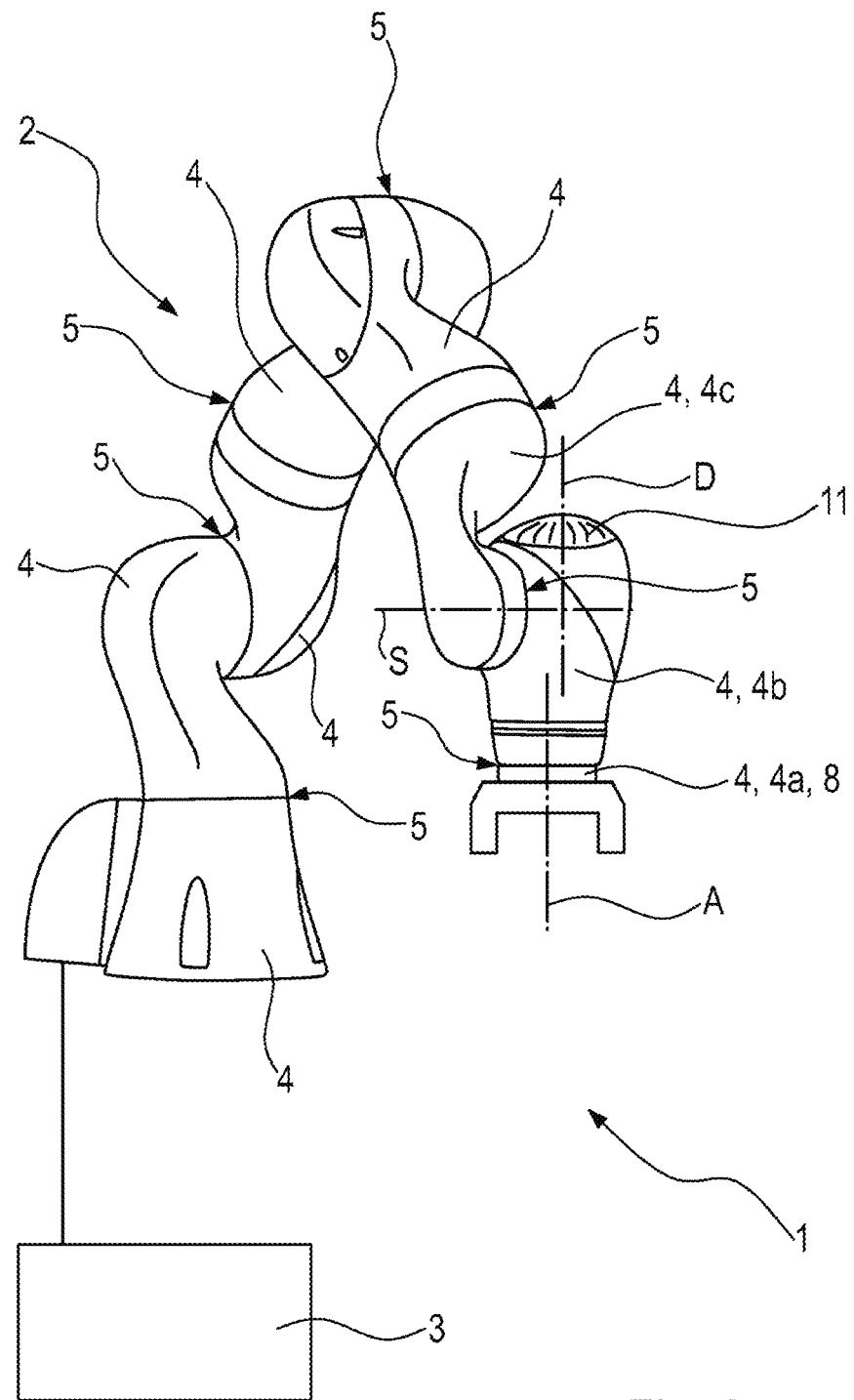
FIG. 1 depicts a robot arm by way of example comprising seven joints and eight links, as well as a robot controller that controls the joints of the robot arm, FIGS. 2 to 4 each show schematic views of a distal end region of a robot arm by way of example comprising an additional output link according to the principles of the disclosure, in the form of a hand guide means.

FIG. 1 shows a robot 1 comprising a robot arm 2 and a robot controller 3 that actuates the robot arm 2. The robot arm comprises multiple joints 5 and multiple links 4, which are adjustable relative to one another by the movements of the joints 5 of the robot arm 2, a drive device 6 being paired with each driven joint 5 and the respective drive device 6 being designed to adjust the joint 5 of the robot arm 2 paired with it, namely by respective automatic actuation of a motor 7 of the respective drive device 6, comprising a distal end link 4a designed as a tool flange 8, a hand link 4b mounted directly upstream of the distal end link 4a in the kinematic chain of joints 5 and links 4, on which the distal end link 4a is rotatably mounted about a flange axis of rotation A, and an additional output link 10 (FIG. 6), which is arranged opposite the distal end link 4a on the hand link 4b so as to be rotatable about a flange axis of rotation A parallel to the axis of rotation D. A hand guide means 11 is attached to the additional output link 10.

As shown, the robot arm 2 may comprise a mechanical configuration such that the flange axis of rotation A of the tool flange 8 always runs parallel to the axis of rotation D of the additional output link 10 and/or the hand guide means 11, in particular the flange axis of rotation A of the tool flange 8 and the axis of rotation D of the additional output link 10 and/or the hand guide means 11 always lie on the same straight line, and in this case a pivot axis S, about which the hand link 4b is mounted rotatably on an arm link 4c of the robot arm 2 directly upstream of the hand link 4b in the kinematic chain, is always arranged perpendicularly to the flange axis of rotation A of the tool flange 8 and to the axis of rotation D of the additional output link 10 or of the hand guide means 11.

Figure 2:
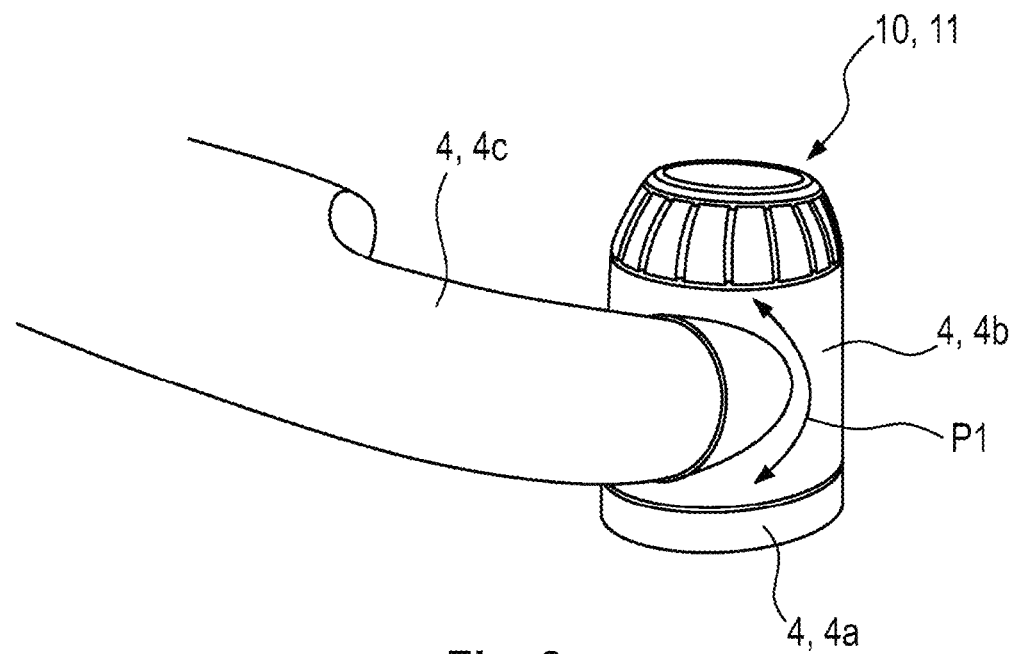

FIG. 2 is a partial view of the hand link 4b in a slightly modified manner with regard to the shape of the robot arm, as said link can be swiveled or rotated about the swivel axis S in the direction of the arrow P1. The additional output link 10 and the hand guide means 11 are arranged opposite the tool flange 8.

Figure 5:
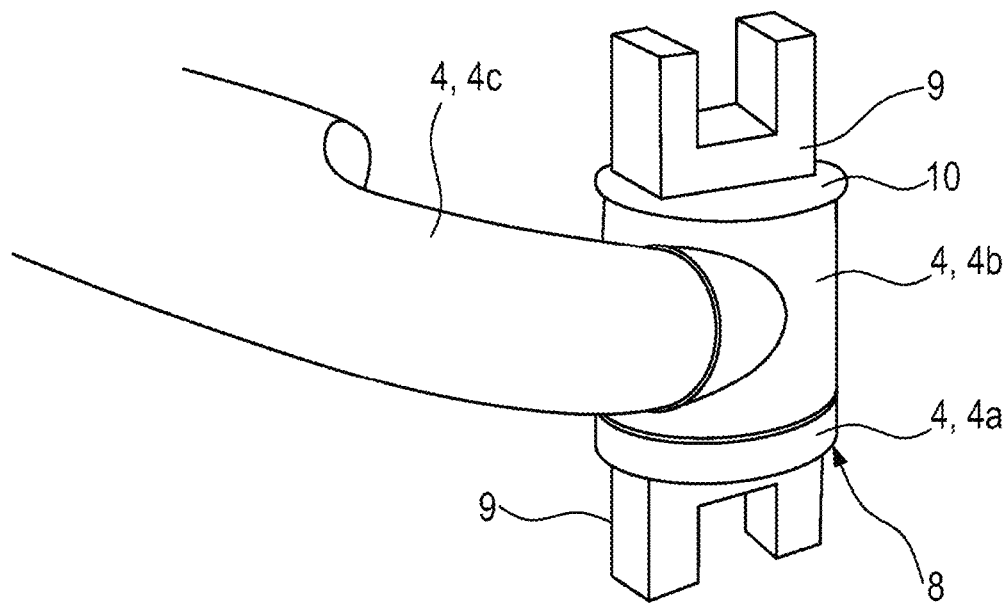
FIG. 5 shows a schematic view of a distal end region of a robot arm by way of example comprising an additional output link according to the principles of the disclosure, in the form of a tool coupling means having an additional tool, FIGS. 6 and 7 each show a sectional view of a hand link of a robot arm and the additional output link mounted therein.

The hand guide means 11 can be detachable from the hand link 4b, so that an additional tool 9 can be coupled to the hand link 4b or to the additional output link 10, instead of the hand guide means 11. This is shown in greater detail in particular in FIG. 5.

Figure 3:
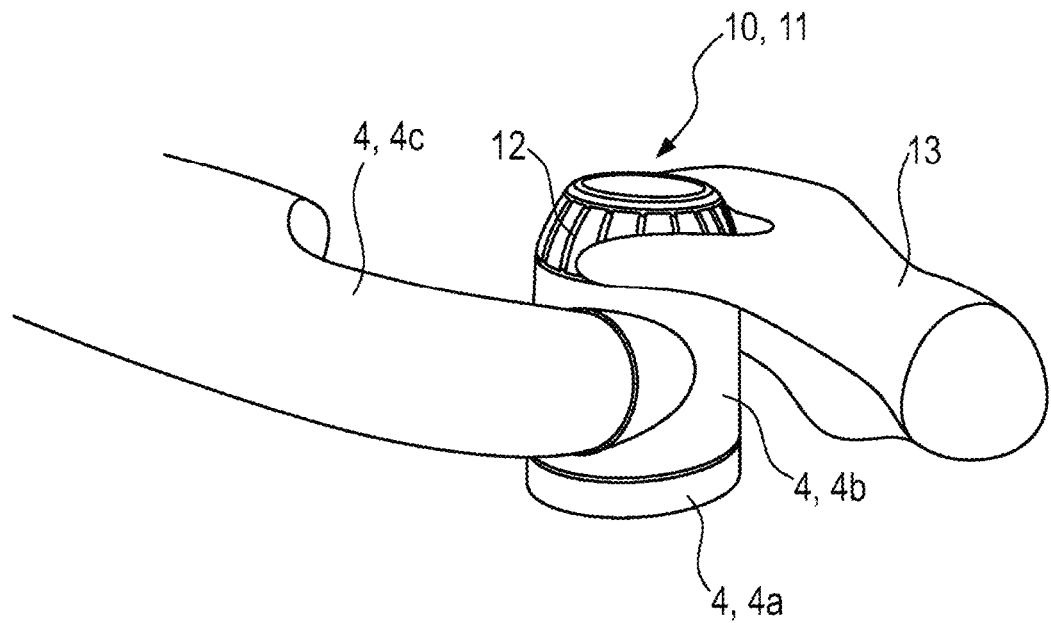

However, as indicated in FIG. 3, the hand guide means 11 may comprise grip portions 12 which are arranged on an annular surface of the hand guide means 11 as shown, so that the hand guide means 11 can be gripped and rotated by the fingers of a person's hand 13. As an alternative or in addition to manual rotation of the hand guide means 11, the robot arm 2 can very generally be adjusted in its joint angle positions on the hand guide means 11 by guiding it by means of the hand 13.

Figure 4:
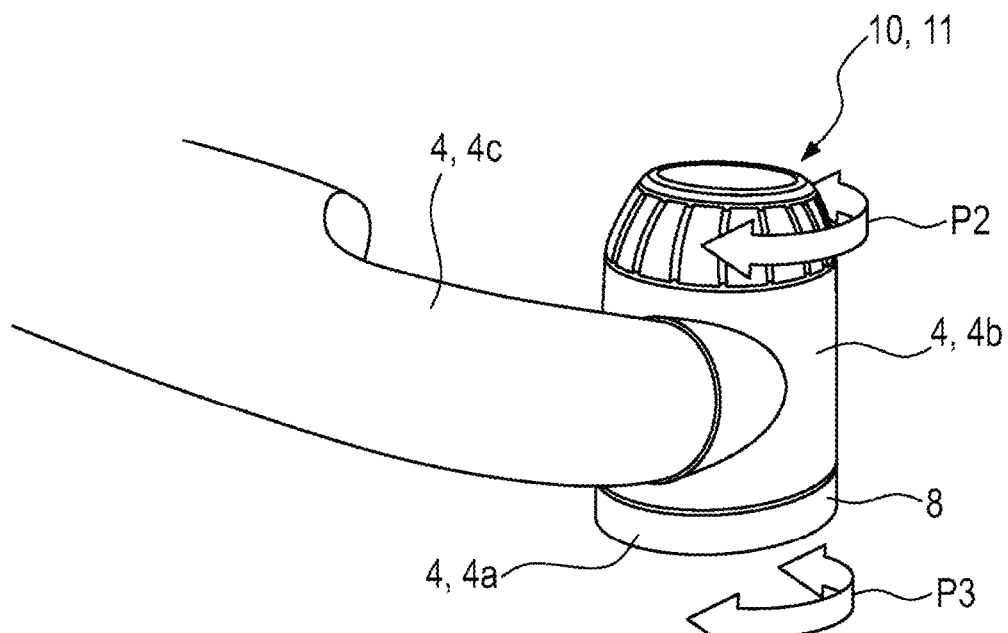

As shown in FIG. 4, the hand guide means 11 on the additional output link 10 can be configured in such a way that, by rotating the hand guide means 11 about the direction of the arrow P2, the tool flange 8 performs a correspondingly coupled rotational movement about the direction of the arrow P3. The rotation of the hand guide means 11 can be converted into an identical rotational movement of the tool flange 8, or be converted into the rotational speed or angular velocity. It is also possible for the tool flange 8 to perform a rotational movement opposite to the rotation of the hand guide means 11, but in this case still depending on the adjustment of the hand guide means 11, either synchronously or asynchronously.

Figure 6:
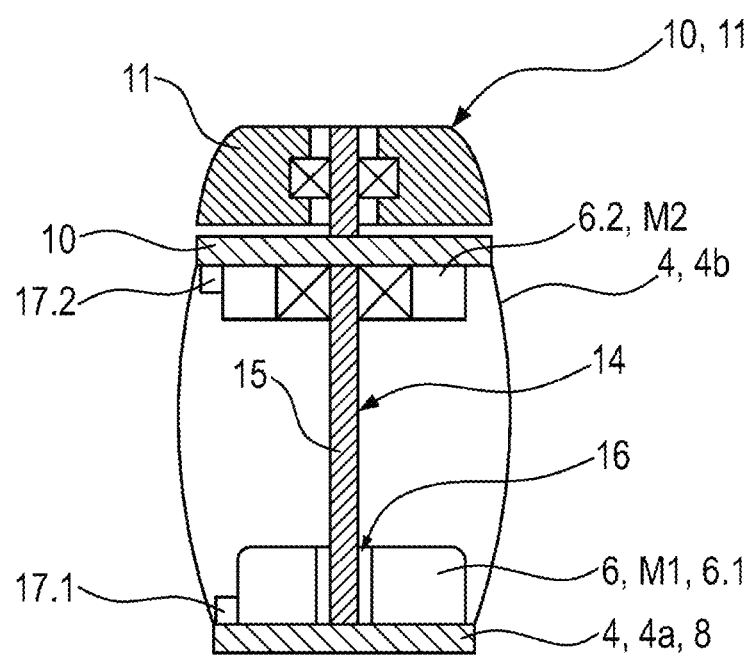

FIG. 6 shows that a transmission 14 can be arranged within the hand link 4b, which transmission is designed to couple the additional output link 10 to the distal end link 4a in order to convert a movement of the distal end link 4a into a movement of the additional output link 10 and/or in order to convert a movement of the additional output link 10 into a movement of the distal end link 4a. As shown, the transmission 14 may comprise a shaft 15 which is designed to transmit a torque between the additional output link 10 and the distal end link 4a or the tool flange 8. The transmission 14 may comprise a shiftable coupling 16, which is designed to transmit a torque between the additional output link 10 and the distal end link 4a in an engaged state and to interrupt a transmission of a torque between the additional output link 10 and the distal end link 4a in a disengaged state. A motor M1 can be integrated into the hand link 4b as the drive device 6.

In this respect, the distal end link 4a can be paired with a first drive device 6.1, which is designed to automatically move the distal end link 4a, the additional output link 10 or the hand guide means 11 being paired with a second drive device 6.2, which is different from the first drive device 6.1 and is designed to move the additional output link 10 or the hand guide means 11. Consequently, the hand guide means 11 may thus comprise a force feedback device. In this respect, the first drive device 6.1 may comprise a first motor M1 and the second drive device 6.2 may comprise a second motor M2, it being possible for the first motor M1 and the second motor M2 to, for example, be actuated by the control device 3 in a manner dependent on one another.

The distal end link 4a, i.e., the tool flange 8, can be paired with at least one first position sensor 17.1, which is designed to detect the rotational position of the distal end link 4a, and the additional output link 10 can be paired with at least one second position sensor 17.2, which is designed to detect the rotational position of the additional output link 10.

Figure 7:
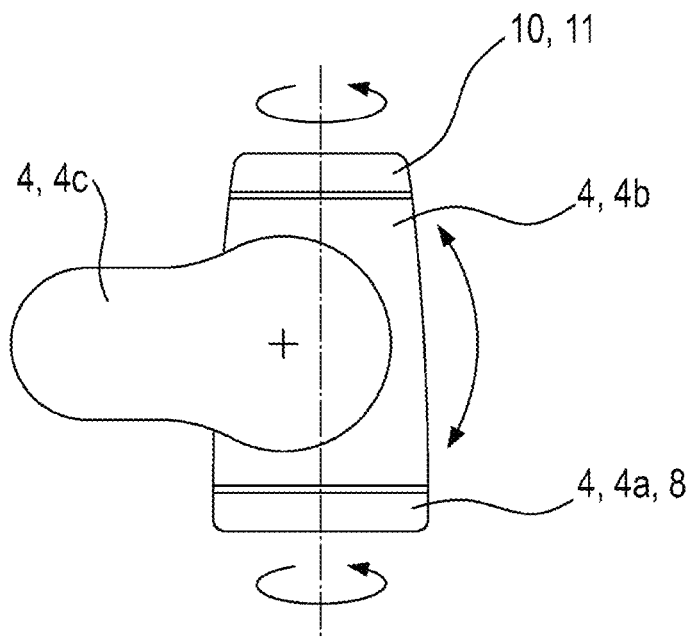

FIG. 7 shows schematically that, due to the pivotable mounting of the hand link 4b on the arm link 4c about the pivot axis S, the distal end link 4a, i.e., the tool flange 8, can optionally be aligned pointing downwards, and the additional output link 10 or the hand guide means 11 pointing upwards, or the distal end link 4a, i.e., the tool flange 8, can be aligned pointing upwards, and the additional output link 10 or the hand guide means 11 pointing upwards.

Figure 8:
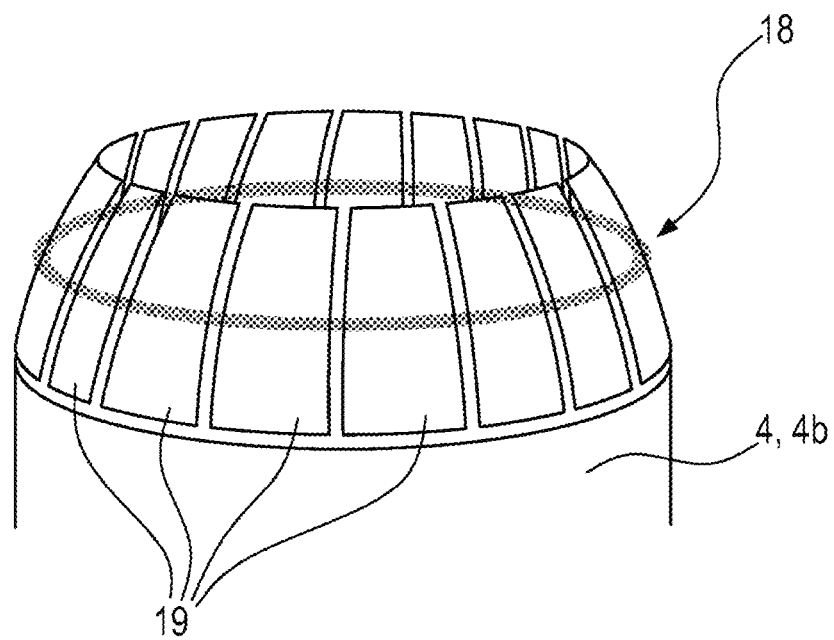
FIG. 8 shows an enlarged partial view of a hand link of the robot arm in the region of the hand guide means, having multiple input means.
Figure 9:
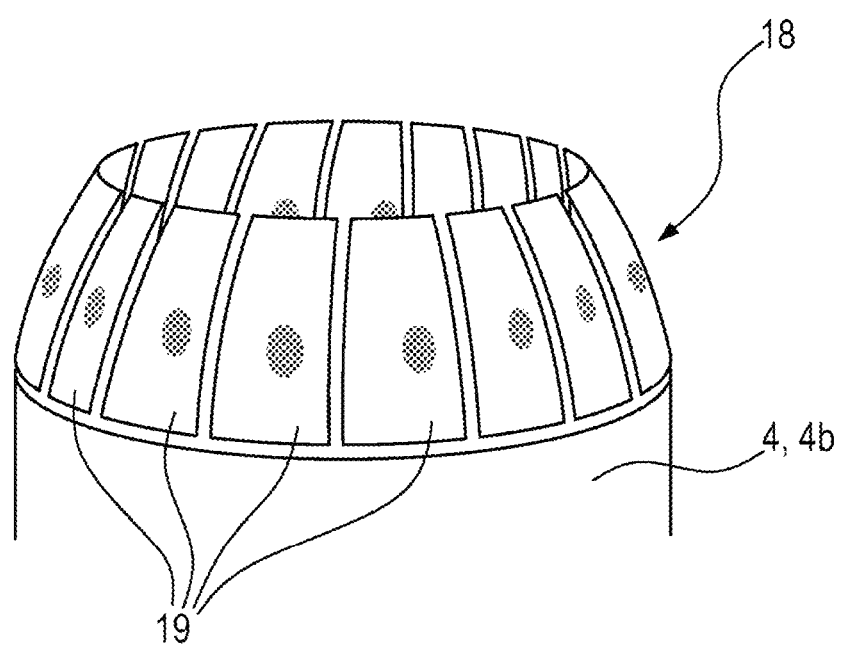
FIG. 9 shows an enlarged partial view of a hand link of the robot arm in the region of the hand guide means, having multiple display means.
Figure 10:
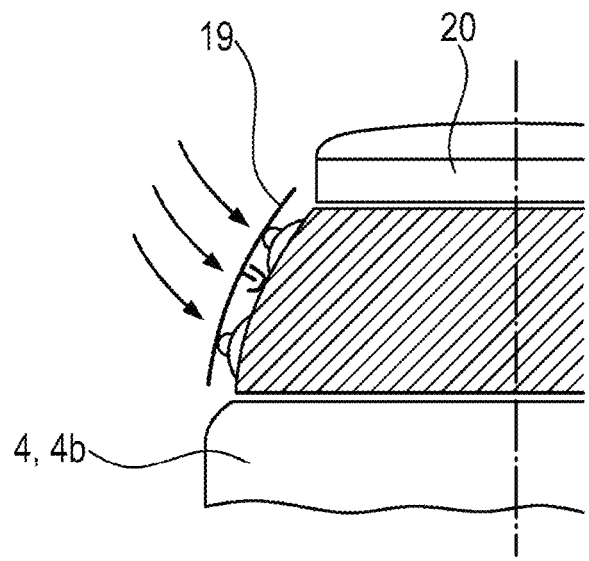
FIG. 10 shows a schematic sectional view in the region of an input means designed as a rocker switch.
Figure 11:
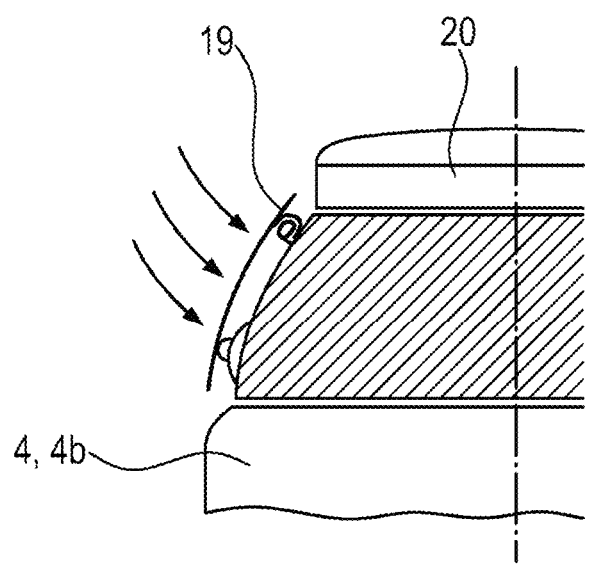
FIG. 11 shows a schematic sectional view in the region of an input means designed as a button.
Figure 12:
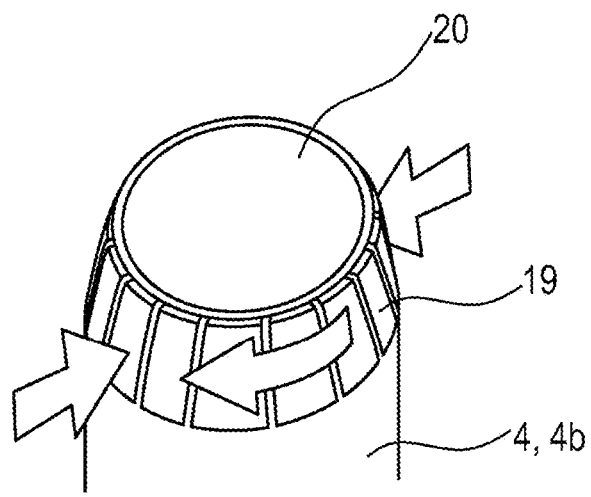
FIGS. 12 to 14 show schematic views of hand guide means on the hand link of the robot arm, each of which comprises display means on the end face.
Figure 13:
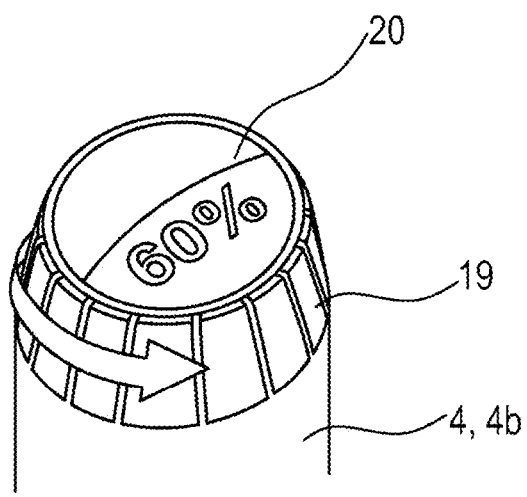
Figure 14:
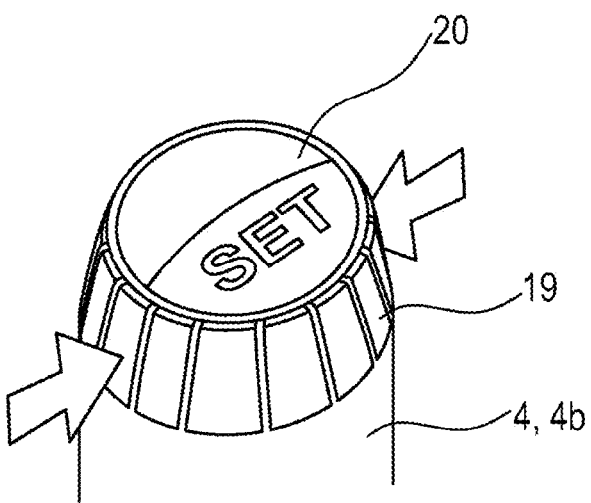

As FIG. 8 and FIG. 9 show, the hand guide means 11 may comprise one or more input means 18, which are designed for the manual input of control commands into a control device 3 actuating the robot arm 2. FIG. 10 shows, by way of example, an input means 18 designed as a rocker switch, and FIG. 11 shows, by way of example, an input means 18 designed as a button.

The combined hand guide means 11 and input means, which is positioned in the swivel housing of the robot hand 4b between the last and the penultimate distal axis of the robot arm 2, can accordingly form a support surface for the hand 13, through which the user can ergonomically guide the robot arm by hand and can move the first n−1 axes of the n-axis robot arm in a directly force-controlled manner.

The preferably annular rotatable input field can be used to digitally and directly predetermine the movement of the distal end link 4a, i.e., the tool flange 8, from the hand link 4b, wherein corresponding feedback may optionally be transmitted back to the user via the hand 18. The operation of the last axis of rotation is perceived as particularly direct and natural due to the following points.

The ring can be designed to rotate like a jog wheel and therefore does not have to have a centering middle position. For the purpose of precise and deliberate input, the ring can be friction-bound, i.e., have a damped behavior or include a segmental raster that the user perceives haptically when turning. In an advantageous variant, this restraining torque can be variable in a controlled manner in order to obtain direct force feedback from the real last axis, for example in the event of a collision of the tool 19 (FIG. 5) or when the axis limits of the joints of the robot arm 2 are reached.

The hand guide means 11 or the input means can be configured in the form of an enabling switch. The operating concept presented represents a holistic approach in which the user should be able to guide the robot arm 2 using just one hand. Therefore, depending on the robot type, hazard potential and regulations, an enabling switch may also be required for manual operation. For example, a switch or button element can be placed on the input ring to enable approval with simultaneous manual guidance. For example, by lightly pressing the ring together, travel can be released, the last axis (joint of the robot arm 2) can be actuated by turning it, and the rest of the robot can be moved by moving the hand rest. Contact buttons, for example capacitive or inductive, are likewise also possible.

As embodiments, as shown by way of example in FIG. 8 and FIG. 9, one or more contiguous switching surfaces 19 in the form of a ring, e.g., routed switching strips or individual switching elements, such as buttons, can be provided, which can also be placed under a ring of button segments, for example, and can be actuated by the latter when pressed.

In this case, the switching surfaces 19 can be suspended so that they slide individually in the same way as keys on a computer keyboard or tilt individually (FIG. 10 and FIG. 11) and act on the button. A design is also possible in which the switching surfaces 19 are made continuously of a flexible material, e.g., plastics material such as elastomer, and both the connections to one another and the guide functions and the switching surfaces 19 are directly integrated by means of suitable shaping and a targeted stiffness distribution.

The hand guide means 11 may comprise at least one display means 20, which is designed to visually display states of the robot arm 2 and/or the control device 3 on the hand guide means 11.

The display means 20 can, for example, comprise an LED ring. An LED ring that can be actuated segment by segment, for example, can display the inputs via the operating ring. The light sources of the LED ring can, for example, be paired individually or in groups with individual input devices or buttons in each case. A display, as the display means 20, can be used to very clearly show 0-100% settings, e.g., speed values, and/or angular settings, e.g., axle angle values. General information such as a status can also be clearly displayed.

A central display can optionally or alternatively be provided, which can show essential information and, for example in combination with the LED ring and operating ring as well as the enabling switch, represents a new, intuitive but also very puristic operating concept.

If the control element is used in input mode, the setting ring can be used to scroll through a menu on the display, set a value or select a function, for example. A brief activation of the enabling switch selects the program or menu item. The "back option" can also be selected or a gesture control can be selected, e.g., briefly touching the robot structure then means "back."

If the operating element is operated in hand guiding mode, the movement of the ring can normally be transmitted 1:1 to the flange axis. If required, a "digital translation" can also change the movement to slow or fast.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A robot arm, comprising:
a plurality of links connected by a plurality of joints to define a kinematic chain, wherein the links are adjustable relative to one another by movements of the joints;
each joint paired with a drive device configured to adjust the respective joint;
a distal end link designed in the form of a tool flange;
a hand link arranged directly upstream of the distal end link in the kinematic chain of the joints and links;
the distal end link rotatably mounted on the hand link about a flange rotational axis; and
an additional output link rotatably mounted on the hand link about a rotational axis that is parallel to the flange rotational axis, and which is arranged on the hand link so as to lie opposite the distal end link.

2. The robot arm of claim 1, wherein each drive device is designed to adjust the respectively paired joint by automatic actuation of a motor of the drive device.

3. The robot arm of claim 1, further comprising:
a transmission arranged within the hand link;
the transmission configured to couple the additional output link to the distal end link in order to at least one of:
convert a movement of the distal end link into a movement of the additional output link, or
convert a movement of the additional output link into a movement of the distal end link.

4. The robot arm of claim 3, wherein the transmission comprises a shaft configured to transmit a torque between the additional output link and the distal end link.

5. The robot arm of claim 3, wherein the transmission comprises a switchable coupling, the switchable coupling having an engaged state wherein the switchable coupling is configured to transmit a torque between the additional output link and the distal end link, and having a disengaged state wherein the switchable coupling is configured to interrupt a transmission of torque between the additional output link and the distal end link.

6. A robot arm, comprising:
a plurality of links connected by a plurality of joints to define a kinematic chain, wherein the links are adjustable relative to one another by movements of the joints;
each joint paired with a drive device configured to adjust the respective joint;
a distal end link designed in the form of a tool flange;
a hand link arranged directly upstream of the distal end link in the kinematic chain of the joints and links;
the distal end link rotatably mounted on the hand link about a flange rotational axis; and
an additional output link rotatably mounted on the hand link about a rotational axis that is parallel to the flange rotational axis, and which is arranged on the hand link so as to lie opposite the distal end link;
wherein the distal end link is paired with a first drive device which is designed to move the distal end link; and
the additional output link is paired with a second drive device which is different from the first drive device and is designed to move the additional output link.

7. The robot arm of claim 6, wherein:
the first drive device comprises a first motor;
the second drive device comprises a second motor; and
the first motor and the second motor are controllable by a control device in a manner dependent on one another.

8. The robot arm of claim 7, further comprising:
at least one first position sensor paired with the distal end link, the at least one first position sensor configured to detect a rotational position of the distal end link; and
at least one second position sensor paired with the additional output link, the at least one second position sensor configured to detect a rotational position of the additional output link.

9. A robot arm, comprising:
a plurality of links connected by a plurality of joints to define a kinematic chain, wherein the links are adjustable relative to one another by movements of the joints;
each joint paired with a drive device configured to adjust the respective joint;
a distal end link designed in the form of a tool flange;
a hand link arranged directly upstream of the distal end link in the kinematic chain of the joints and links;
the distal end link rotatably mounted on the hand link about a flange rotational axis;
an additional output link rotatably mounted on the hand link about a rotational axis that is parallel to the flange rotational axis, and which is arranged on the hand link so as to lie opposite the distal end link; and
a hand guide arranged on the hand link and connected to the additional output link such that at least one of:
the additional output link is adjustable by manual actuation of the hand guide, or
the hand guide is automatically adjusted by automatic driving of the additional output link.

10. The robot arm of claim 9, wherein:
the hand guide is manually detachably fastened to the hand link or to the additional output link;
the additional output link comprises a tool coupling configured for coupling an additional tool thereto;
in an attached state of the hand guide with the hand link or the additional output link, the tool coupling is covered by the hand guide; and
in a detached state of the hand guide from the hand link or the additional output link, the tool coupling is accessible for coupling the additional tool thereto.

11. The robot arm of claim 9, wherein the hand guide comprises at least one of:
a grip portion designed for manually guiding the robot arm by a user's hand;
at least one input means designed for manually inputting control commands into a control device which actuates the robot arm; or
at least one display designed for optically displaying on the hand guide states of at least one of the robot arm or the control device.

* * * * *